United States Patent [19]

Anderson

[11] 4,096,662
[45] Jun. 27, 1978

[54] PLANT STAKE INCLUDING BASKET

[76] Inventor: Joseph Anderson, 1950 Kennedy Rd. #505, Scarborough, Ontario, Canada

[21] Appl. No.: 706,245

[22] Filed: Jul. 19, 1976

[51] Int. Cl.² .......................... A01G 9/02; A01G 9/12
[52] U.S. Cl. .......................................... 47/70; 47/47; 47/78; 248/170; 248/318; 256/DIG. 5
[58] Field of Search ................ 47/76, 42–47, 47/78, 58, 70; 248/156, 170, 434, 435, 525, 132, 370, 318, 327; 211/196, 203; 256/DIG. 5

[56] References Cited

U.S. PATENT DOCUMENTS

| | | | |
|---|---|---|---|
| 1,250,833 | 12/1917 | Flanegin | 248/435 X |
| 1,525,701 | 2/1925 | Rose et al. | 248/170 X |
| 1,974,367 | 9/1934 | Schaible | 47/44 |
| 2,394,192 | 2/1946 | Mann | 47/78 |
| 2,435,539 | 2/1948 | Govid | 47/44 X |
| 2,762,598 | 9/1956 | Runge | 248/327 |
| 2,902,795 | 9/1959 | Heigl et al. | 47/58 |
| 2,917,804 | 12/1959 | Barron | 248/327 X |
| 3,324,591 | 6/1967 | Bergstein | 47/78 |
| 3,415,012 | 12/1968 | Stubbmann | 47/78 |

FOREIGN PATENT DOCUMENTS

| | | | |
|---|---|---|---|
| 547,094 | 4/1956 | Belgium | 47/58 |
| 625,839 | 7/1949 | United Kingdom | 248/170 |
| 330,773 | 6/1930 | United Kingdom | 248/170 |

*Primary Examiner*—Edgar S. Burr
*Assistant Examiner*—Steven A. Bratlie

[57] ABSTRACT

A plant stake is disclosed comprising a telescoping post supported on legs that swing pivotally from the base of the post into engagement with the ground. Ground anchor members are provided at the end of the legs for securing the post in a position such that the post may be aligned vertically by adjustment of the legs. A basket is suspended from beneath the post, the basket being used to support or grow tuberous plants. The basket is hoisted from a level slightly below ground level up to the base of the post by means of a hoist such as a threaded shaft having a rotatable flange thereon on which the basket may be secured, the threaded shaft threadably engaging either the flange or the post along the longitudinal axis of the post.

6 Claims, 6 Drawing Figures

U.S. Patent  June 27, 1978  4,096,662
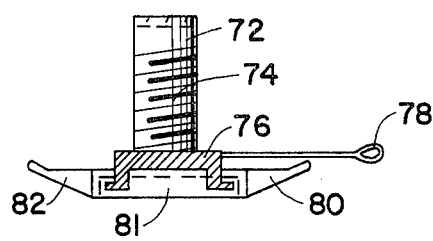
FIG. 6
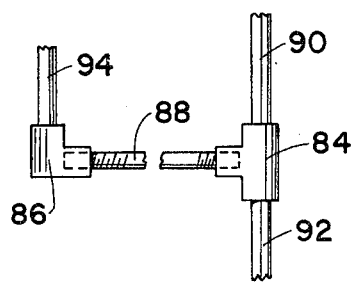
FIG. 5
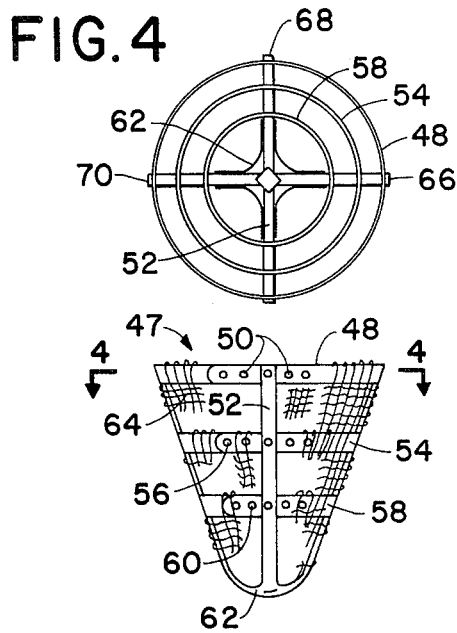
FIG. 4
FIG. 2
FIG. 3
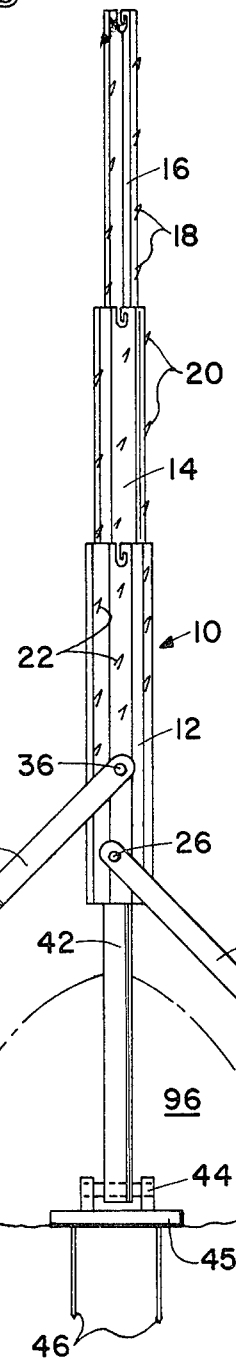
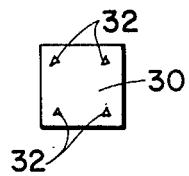
FIG. 1

4,096,662

PLANT STAKE INCLUDING BASKET

SUMMARY OF THE INVENTION

The present invention relates to a plant stake comprising a telescopically adjustable post, barbs being provided on the post for supporting foliar plant growth. Legs extend from the base of the post for supporting said base above ground level. The leg members terminate in ground anchor members. The legs are pivotally secured to the post by pivots, each of said pivots having a longitudinal axis transverse to the longitudinal axis of the post, the longitudinal axis of each of the pivots being at an angle to one another or the pivots being separated sufficient to support the post in a substantially upright position when the legs are extended outwardly away from the post.

In one embodiment, the ground anchors comprise a spiked plate pivotally secured to the free ends of the legs.

A basket may be suspended from the stake for carrying tuberous plants, a hoist being provided on the stake for raising the basket from the level beneath the post to a level next adjacent the post. The hoist in one embodiment is used to raise the basket from a level slightly beneath the level of the ground to a level above the ground thereby enabling the stake to be used not only for the support of the foliar portion of a tuberous plant during its development but also in the harvesting of the tuberous portion of the plant by operating the hoist in combination with the basket.

The hoist in one embodiment comprises a threaded shaft longitudinally extending into the post and threadably engaging a flanged basket support on the walls of the post. A crank is secured on the shaft for turning the shaft, a securing member being provided to attach the shaft to the basket, the flange rotatably secured to the base of the shaft.

The basket comprises a substantially frusto-conical shape basket having a diamond-shaped support plate in the frustum end thereof.

BRIEF DESCRIPTION OF THE DRAWING

FIG. 1 is a side elevation illustrating the stake having legs pivotally secured to the base thereof according to one embodiment of the present invention;

FIG. 2 is a side elevation illustrating illustrating a basket for holding a tuberous plant root beneath the ground and which may be employed to hoist such tuberous plant from below ground level up to the base of the post of the stake according to another embodiment of the present invention.

FIG. 3 is a plan view illustrating the base of a ground anchor member secured to the free end of one of the legs supporting the post of the plant stake according to another embodiment of the present invention;

FIG. 4 comprises a plan view taken along the line 4—4 of FIG. 2 illustrating the top of a basket according to another embodiment of the present invention;

FIG. 5 comprises a plan view of lateral members for joining the tops of the plant stake of the present invention to one another according to another embodiment of the present invention;

FIG. 6 comprises a hoisting member having a shaft with threads thereon for threadably inserting into the base of the post of the stake of the present invention, the ends of the hoist being secured or securable to a basket in which tuberous plants may be contained according to another embodiment of the present invention.

DETAILED DESCRIPTION

Plant stakes known in the prior art are disclosed in U.S. Pat. Nos. 3,447,263 Johnson; 3,397,485 Peterson; 3,174,255 Knell; 3,165,863 Duran; 3,061,976 Carroll, et al; 3,004,366 Jaspert, Jr.; 2,903,823 Westford; and, 1,758,839 Causy.

None of the foregoing references disclose a method for supporting a plant or which would aid in the harvesting of the edible portions thereof.

Accordingly, it is an object of the present invention to overcome these and other difficulties encountered in the prior art.

It is also an object of the present invention to provide a novel plant stake.

These and other objects have been achieved according to the present invention and will become apparent by reference to the disclosure and claims that follow as well as the appended drawing.

Referring to the drawings and FIGS. 1 through 6, a novel plant stake is illustrated having several advantages over the prior art plant stakes noted in the references cited herein.

Referring to the drawing, a plant stake 10 is illustrated comprising a series of telescoping posts, 12, 14 and 16, said posts having barbs 18, 20 and 22 thereon for supporting the foliar and/or foliar and vining growth of tuberous as well as non-tuberous plants such as respectively yams, grapes and the like. The telescoping sections 12, 14 and 16 may be locked in place after extended by means well known in the art. The base of post 12 has at least three legs 24, 34 and 42 pivotally secured thereto by means of pivots 26 and 36 for legs 24 and 34 respectively, the pivot for leg 42 not being illustrated. Pivots 26 and 36 have longitudinal axes that are transverse to the longitudinal axis of post 12, the longitudinal axes of pivots 26, 36 and the similar pivot for leg 42 being separated or at an angle to one another sufficient to support the post 12 and the telescoping extensions 14 and 16 extending therefrom in a substantially upright or vertical position when the legs 24, 34 and 42 are extended outwardly away from the post. The free ends of the legs 24, 34 and 42 terminate in ground anchor means, these ground anchor means comprising spiked plate 30, 39 and 45 pivotally secured to the free ends of legs 24, 34 and 42 respectively by means of pivot pins 28, 38 and 44. Plates 30, 39 and 45 terminate respectively in spikes 32, 40 and 46 extending therefrom.

A basket such as the basket 47 illustrated in FIG. 2 is provided for the placement of a tuberous plant therein during the growth of the tuberous plant, this tuberous plant comprising by way of an example, a yam, i.e., the useful members of the dioscoreaceae family. These tuberous growth develop in size anywhere from about 2 to 3 feet in diameter and about 4 feet in length and present some difficulty in harvesting because of their bulk. By placing the small tuber in the basket 47 as illustrated in FIG. 2 prior to its full development, harvesting of the tuber is accomplished more readily. The basket comprises a series of concentric bands 48, 54 and 58 which are overlappingly adjustable through snap fasteners 50, 56 and 60 respectively. Supporting bands 52, 66 68 and 70 are provided to give the basket some vertical rigidity. The supporting bands terminate in diamond shaped plate 62. The basket is in turn covered with a mesh 64 of a fiber employed in the manufacture of synthetic rope such as polypropylene, nylon, poly (ethylene glycol terephthalete) (Dacrom; TM) and the art known equivalents thereof.

Basket 47 is implanted slightly below the surface of mound 96, basket 47 having a tuberous plant therein and upon full development of the tuberous plant may be removed from the ground by means of a hoist comprising a shaft 72 having threads 74 thereon shaft 72 being either threadably insertable into the base of post 12, shaft 72 terminating in a flange 76 which rotates freely within a collar 81 having hooks 80 and 82 at the periphery thereof. Hooks 80 and 82 are inserted inside of band 48 after shaft 72 is threadably lowered from post 12 and when ready for harvesting the tuberous plant in basket 47 is raised from beneath the surface of the ground up to the base of post 12 by rotating the shaft 72 through crank handle 78 secured to flange 76. A plurality of plant stakes may be secured to one another through a latice network, various latice network fastenings being illustrated in FIG. 5 and comprise fittings such as fittings 84 and 86 which are securable to the top of telescoping post 16, these fittings being joinable to one another through lateral arms 88 threadably insertable into fittings 84 and 86, lateral arms 90, 92 and 94 being illustrated to indicate the various directions in which the lateral arms may be extended from the variety of fittings such as fittings 84 and 86.

The stake of the present invention has a footing based on the extension of the arms 24, 34 and 42 that allows the stake to be secured sufficiently to the ground and provide stability to the stake once the spike ends of the ground anchor members are driven into the soil. In harvesting, the flat portions or plates 30, 39 and 45 of the ground anchors resist penetration into the soil when pressure is applied to threaded shaft 72 and also when additional weight is created by increased foliage on trellis or latice members at the upper extremities of the stake. This is important especially in damp soils and in tropical countries where strong winds and storms are prevelant. The arms 24, 34 and 42 are provided to straddle a hemispherical mound 96 up to about 100 centimeters in height and over 200 centimeters in diameter. The plant stake is especially suited to compensate for different angles of elevation or depression in the ground into which the stake is inserted so the stake can be used on a hilly or sloping land, a feature developed taking into account the type of terrain used for growing the useful members of the yam family, i.e., dioscoreaceae. The basket 47 takes into account the harvesting of the crop supported by the stake. The stake of the present invention allows for the harvesting of any tuber especially the yam which is a laborious process involving the excavation and removal of soil from around the product and prevents damage to the tuber especially in those regions where harvesting is done with a machete. The basket minimizes the task and completely avoids product damage and thereby provides better marketability.

The plant stake of the present invention is suspended above the soil level. This provides a wider volume of soil directly beneath the stake for tuber development and expansion especially for large tubered plants such as the yam.

The barbed-like protrusions 18, 20 and 22 arranged in a helical manner assist the natural extension of vines vertically without the need for loops or strings. However, non-vinelike plants may be secured to the stake by cords around the stake or through holes intended for clamp rods.

The stake of the present invention is preferably fabricated from a lightweight metal such as aluminum or aluminum alloys where the plant stake is to be used in corrosive or acidic soils such as those employed for the growing of tuberous plants like yams, the exception being the nest employed in the basket preferably being fabricated from a thermoplastic material described above.

Although the invention has been described by reference to some embodiments, it is not intended that the novel plant stake be limited thereby but that modifications thereof are intended to be included as falling within the broad scope and spirit of the foregoing disclosure, the following claims and the appended drawing.

What is claimed is:

1. A plant stake comprising telescopically adjustable post means having a base, at least 3 leg means extending from said base of said post means for supporting said base above ground level, said leg means terminating in ground anchor means, basket means suspended from said stake for carrying tuberous plants, hoisting means on said stake for raising said basket means from a level beneath said post means to a level next adjacent said post means, said hoisting means comprising threaded shaft means, threaded shaft receiving means operatively engaging said shaft means, crank means for turning said shaft receiving means in relation to said shaft means, securing means on said shaft means for attaching said shaft means to said basket means.

2. The plant stake of claim 1, where said leg means are pivotally secured to said post means through pivot means, each of said pivot means having a longitudinal axis transverse to the longitudinal axis of said post means, the longitudinal axis of each of said pivot means being at an angle to one another sufficient to support said post means in a substantially upright position when said leg means are extended outwardly away from said post.

3. The plant stake of claim 1 further comprising barb means on said stake for support of foliar plant growth.

4. The plant stake of claim 3 where said ground anchor means comprise spiked plates pivotally secured to the free ends of said leg means.

5. The plant stake of claim 1 where said securing means comprises a flange rotatably secured to the base of said shaft means.

6. The plant stake of claim 5 where said basket means comprises a substantially frusto-conical shaped basket having a diamond-shaped support plate in the frustum end thereof.

* * * * *